(12) United States Patent
Wilmer et al.

(10) Patent No.: US 6,914,894 B2
(45) Date of Patent: Jul. 5, 2005

(54) ROLE-BASED IP MULTICAST ADDRESSING IN A WIRELESS LAN

(75) Inventors: Michael E Wilmer, Portola Valley, CA (US); Loc Nhin Ho, San Jose, CA (US); Jerry W. Rice, Los Altos, CA (US); Robert Mehranfar, Brisbane, CA (US); John Murray, Palo Alto, CA (US)

(73) Assignee: Pemstar, Inc., Rochester, MN (US)

( * ) Notice: Subject to any disclaimer, the term of this patent is extended or adjusted under 35 U.S.C. 154(b) by 945 days.

(21) Appl. No.: 09/864,492

(22) Filed: May 23, 2001

(65) Prior Publication Data

US 2002/0176387 A1 Nov. 28, 2002

(51) Int. Cl.[7] .................................................. H04Q 7/24
(52) U.S. Cl. ........................ 370/338; 370/432; 370/475
(58) Field of Search ................................. 370/338, 310, 370/315, 328, 351–353, 389–392, 400–405, 428–429, 431–433, 437, 449–450, 475; 455/415–422, 456

(56) References Cited

U.S. PATENT DOCUMENTS

| | | | | |
|---|---|---|---|---|
| 5,987,011 A | * | 11/1999 | Toh | ............................. 370/331 |
| 6,377,608 B1 | * | 4/2002 | Zyren | ............................ 375/132 |
| 2002/0072383 A1 | * | 6/2002 | Helm et al. | .................. 455/509 |
| 2002/0075940 A1 | * | 6/2002 | Haartsen | ...................... 375/132 |
| 2002/0093948 A1 | * | 7/2002 | Dertz et al. | .................. 370/355 |
| 2002/0097718 A1 | * | 7/2002 | Korus et al. | ................. 370/390 |
| 2002/0122410 A1 | * | 9/2002 | Kulikov et al. | .............. 370/349 |
| 2002/0164963 A1 | * | 11/2002 | Tehrani et al. | .............. 455/101 |
| 2002/0176399 A1 | * | 11/2002 | Wilmer | ....................... 370/349 |
| 2003/0058827 A1 | * | 3/2003 | Chow et al. | ................. 370/338 |

* cited by examiner

Primary Examiner—David Vincent
(74) Attorney, Agent, or Firm—Dorsey & Whitney LLP

(57) ABSTRACT

A wireless LAN communications system capable of supporting communications within a multidisciplinary group or team of individuals, each person equipped with a wireless LAN radio and assigned to one of a number of possible roles in carrying out the mission of the team. A multicast IP address corresponding to a specific role within the group, a multicast IP address corresponding to a specific subgroup within the group, or a multicast IP address corresponding to a generic subgroup within the group is assigned to each LAN radio.

12 Claims, 1 Drawing Sheet

ROLE-BASED IP MULTICAST ADDRESSING IN A WIRELESS LAN

FIELD OF THE INVENTION

The present invention to wireless communications systems and in particular to a method for utilizing multicast addressing to manage communications among a group.

BACKGROUND OF THE INVENTION

The Land Warrior Program represents one aspect of the Army's efforts to modernize the soldier. The Land Warrior Program will make rapid deployable light forces more effective on the future battlefield. Specifically, an integrated, modular fighting system for the infantryman is being developed by employing existing and developing technologies. Examples of Land Warrior objectives include reducing weight and cost by consolidating functionality, integrating components from similar systems, and providing capability enhancements. Thus, the Land Warrior system includes everything the infantryman wears and carries integrated into a close combat fighting system which enhances his situational awareness, lethality, survivability, mobility, sustainment, and training.

One key element of the Land Warrior program comprises a sophisticated communication system that allows every soldier to know where he is, where the enemy is, where his buddies are and what he is to do. A military organization is characterized by its hierarchy, which generally comprises a number of specific roles as well as discrete subgroups of individuals. Specific roles within the military organization include hierarchies of leaders, platoons, divisions and the like. In addition, the organization also comprises subgroups or subsets, for example, medics or $2^{nd}$ squad members. Effective communication within such an organization requires the ability to send messages from individual to individual as well as to all individuals having a specific role or being a member of a specific subgroup. Together with this ability to target messages, security, efficiency and clarity require that messages not be delivered to roles or subgroups for which they are not intended.

Accordingly, it is an object of the invention to provide a wireless communication method for delivering messages to specific roles or subgroups within a military organization. It is a further object of the invention to provide such communications to any organization or team having defined roles or subgroups. It is another object of the invention to provide such communications using IP multicasting protocol. It is yet another object of the invention to allow the formation of ad hoc subgroups.

SUMMARY OF THE INVENTION

This disclosure relates to a wireless LAN communications system capable of supporting communications within a multidisciplinary group or team of individuals, each person equipped with a wireless LAN radio and assigned to one of a number of possible roles in carrying out the mission of the team. As such, the invention is a method of communication comprising the steps of providing a group of individuals equipped with a LAN radio, wherein the group comprises a plurality of specific roles, assigning each LAN radio a first multicast IP address corresponding to a specific role; and routing information between the plurality of LAN radios such that information intended for an individual acting in a specific role is identified by a first multicast IP address and only delivered to the LAN radio having that first multicast IP address. Preferably, the group further comprises a plurality of specific subgroups and the method further comprises the steps of assigning a second multicast IP address corresponding to a specific subgroup to the LAN radio and routing communications between the plurality of LAN radios such that information intended for individuals acting in a specific subgroup is identified by a second multicast IP address and only delivered to LAN radios having that second multicast IP address. Also preferably, the first and second multicast IP addresses are assigned to the LAN radio depending upon the role or the specific subgroup of the individual equipped with the LAN radio within the group. Further, the role and group membership of the individual using the LAN radio allows the algorithmic determination of the multicast IP addresses.

In another embodiment of the invention, the method further comprises the steps of assigning a supplemental multicast IP address corresponding to a generic class to the LAN radio and routing communications between the plurality of LAN radios such that information intended for individuals acting in the generic class is identified by the supplemental multicast IP address and only delivered to LAN radios having that supplemental multicast IP address.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE PREFERRED EMBODIMENT

Figure 1:
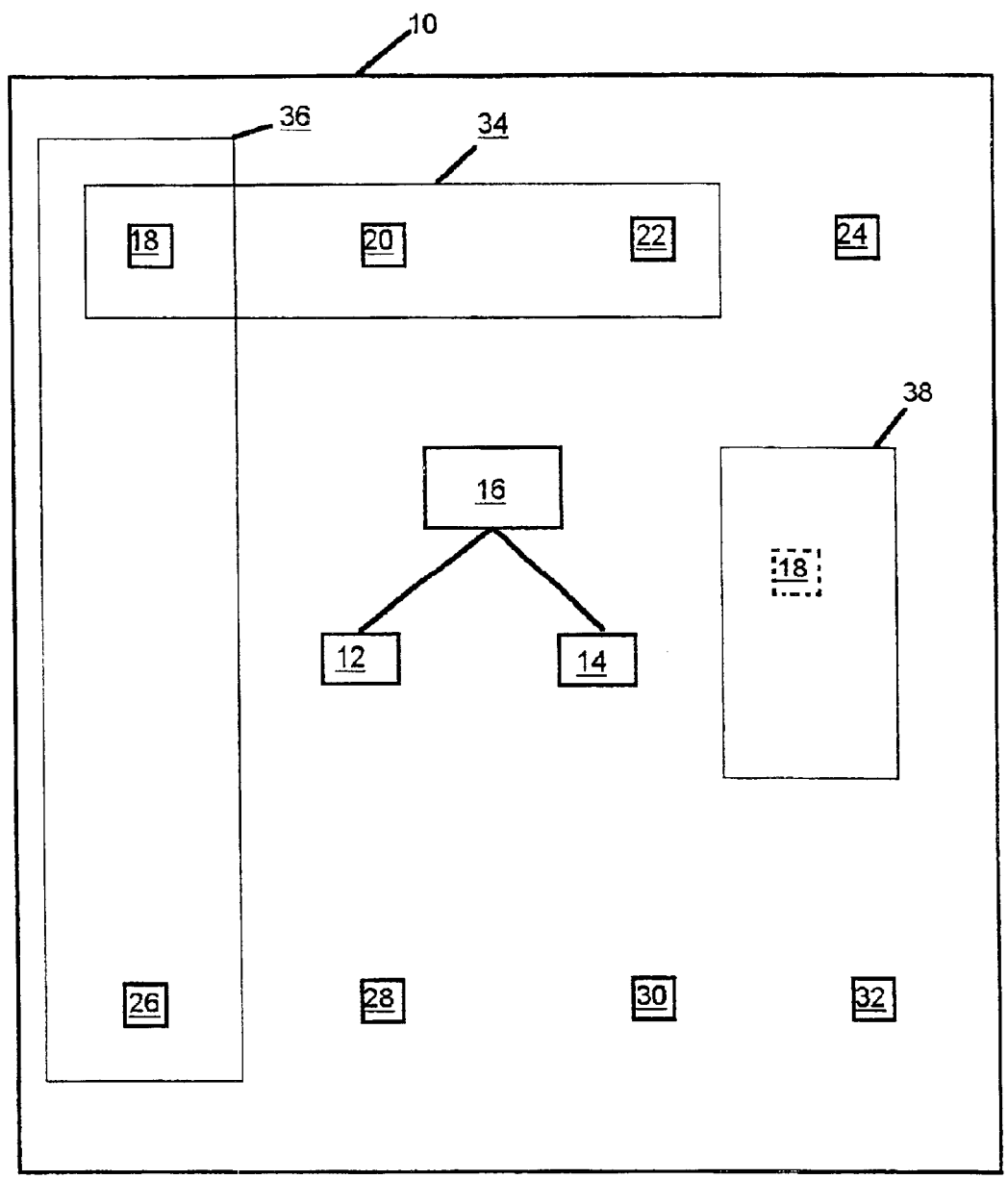
FIG. 1 is a schematic of the wireless LAN communication system of the invention.

This disclosure relates to a wireless LAN communications system capable of supporting communications within a multidisciplinary group or team of individuals, each person equipped with a wireless LAN radio and assigned to one of a number of possible roles in carrying out the mission of the team. Because of the requirements of the standard IP protocol, each device must have a unique identifier known as its IP address, which is referred to as its Intrinsic IP address. Critical communications errors will result if two or more of the devices in a communications region have the same Intrinsic IP address.

A requirement for communications within the team is that members be able to send messages to others based on their roles within the team (e.g. team leader, rifleman, etc.) as well as being able to send messages to particular subsets of the team as appropriate (e.g. squad leaders).

Standard IP protocols define three classes of addressing; namely, unicast, multicast and broadcast. Unicast mode is used in sending a message to one destination IP address. Broadcast mode is used to send messages to all IP addresses that can receive it. Multicast mode has been defined to minimize the amount of router intervention required in sending a message to a number of different IP destinations (which have some common interest or identity and are known as a multicast group, sharing a multicast IP address).

Within the context of this invention, IP Multicast is based on the Internet Group Management Protocol (IGMP), a protocol allowing a multicast router to track the existence of multicast members on local networks coupled to that router. Further, multicast routers use the information provided by IGMP in conjunction with a multicast routing protocol to support forwarding of data across a network of routers. In a preferred embodiment, On Demand Multicast Routing Protocol may be used. Additionally, dense mode protocols such as the Distance Vector Multicast Routing Protocol (DVMRP), the Multicast Open Shortest Path First (MOSPF) protocol, and the Protocol Independent Multicast—Dense Mode (PIM-DM) protocol may be used. Alternatively, sparse mode protocols such as the Core Based Tree (CBT) protocol and the Protocol Independent Multicast—Sparse Mode (PIM-SM) protocol may also be used.

Multicast routing protocols generally utilize a "spanning tree" to define the connection routes between the multicast numbers, involving hops between routers if necessary. The multicast protocols preferably minimize the number of hops for a given route to a multicast group member. Similarly, the protocol should also minimize the duplication of information. Also preferably, the routers should be able to alter the spanning tree depending upon the addition or subtraction of clients within a given multicast group. As understood by those of skill in the art, multicast transmission technology is available at both the data link layer (Layer 2) and the network layer (Layer 3), both of which may be implemented in the practice of the invention. Thus, a LAN radio accessing the network can simultaneously listen to a unicast address, multiple multicast addresses, and the broadcast address. In a first implementation, a LAN radio with an intelligent network interface can filter out unwanted multicasts at Layer 2, minimizing interruption of the LAN radio's processor. In a second embodiment, the invention implements multicast filtering at Layer 3 as well. Further, one of skill in the art will recognize that multicast transmission at Layer 3 requires additional processes, including for example, Class D addressing, dynamic registration of multicast members via an IP datagram protocol between routers and multicast members utilizing join and leave requests and time outs, and multicast forwarding that builds spanning trees and accommodates greater packet loss if UDP is used rather than TCP.

Importantly, the defined role hierarchies of the group using the communication system allows multicast address memberships for a particular role to be computed algorithmically based on the knowledge of that role and the several multicast groups associated with it.

Referring to FIG. 1, a schematic representation of a wireless LAN radio communication system 10 is shown, comprising a plurality of LAN radios 12–26. Each LAN radio comprises transceiver and routing functions. Although only 8 LAN radios are shown for clarity, one of skill in the art will recognize that the system will typically involve scores or hundreds of LAN radios.

When a LAN radio, LAN radio 12 for example, logs into the communication system 10, a unique multicast IP address (e.g., numeric, alphanumeric, etc.) associated with the role the individual carrying the LAN radio 12 is playing in the group is assigned. Naturally, the multicast IP address can be reassigned if desired. As shown, LAN radios 12, 14 and 16 belong to a team 28 within the group and thus are assigned a second Multicast IP address corresponding to that team. Further, a multicast IP address for a specific subgroup 30 of the group may be assigned to the LAN radios. As shown, LAN radios 12 and 20 belong to the same subgroup, and thus share a third multicast IP address corresponding to that subgroup. With this approach, the group can be very large (e.g. Third Army) and may be composed of a number of smaller units (e.g. Company A, First Platoon, Second Squad) and there can be a multicast IP address assigned to each particular team.

The role is assigned to the particular LAN radio at the time of login by the group member. The group member will log in to a particular role (e.g. scout, Squad 1, First Platoon, Company B, . . . ) and an internal database table or a number assigning algorithm will assign the appropriate role based multicast IP address (RBIP) to the unit. The table (or algorithm) will also assign specific multicast IP addresses to subgroups or subsets associated with that role (e.g. paramedics, $2^{nd}$ squad, etc.) so that messages may be addressed to individual group members and to predefined subgroups. The defined role hierarchies of the group using the communication system allows multicast address memberships for a particular role to be computed algorithmically based on the knowledge of that role and the several multicast roles associated with it.

In a further embodiment of the invention, a set of multicast IP addresses are assigned to generic roles/subgroups which are not unique, to allow for the formation of adhoc working teams under conditions in which unit integrity has collapsed and members of various organizations must work together as a team (e.g., login as generic squad Z). Thus, LAN radio 12, in addition to being assigned second and third multicast IP addresses corresponding to team 28 and subgroup 30, can be logged in to generic subgroup 32 with a supplemental multicast IP address.

Accordingly, using the methods of this invention, a multicast IP address is assigned to each class within the group, wherein a class can correspond to a particular role, a specific subgroup or a generic role or subgroup.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. In a wireless communication system comprising a plurality of LAN radios utilizing IP packet communication, a method comprising the steps of:
 a) providing each of a group of individuals with a LAN radio, wherein said group comprises a plurality of specific roles;
 b) assigning each LAN radio a role-based first multicast IP address corresponding to a specific role; and
 c) routing information between said plurality of LAN radios such that information intended for an individual acting in a specific role is identified by a first multicast IP address and only delivered to a first LAN radio having said first multicast IP address.

2. The method of claim 1, wherein the step of assigning each LAN radio a first multicast IP address occurs when an individual using said first LAN radio logs in to the communication system.

3. The method of claim 2, wherein said first multicast IP address is algorithmically assigned to said first LAN radio depending upon the role of said individual equipped with said first LAN radio within said group.

4. The method of claim 1, wherein said group further comprises a plurality of specific subgroups, further comprising the steps of assigning a second multicast IP address corresponding to a first specific subgroup to at least said first LAN radio and routing communications between said plurality of LAN radios such that information intended for an individual acting in said first specific subgroups is identified by said second multicast IP address and only delivered to LAN radios having said second multicast IP address.

5. The method of claim 4, wherein said first multicast IP address is assigned to said first LAN radio depending upon the role of said individual equipped with said first LAN radio within said group and said second multicast IP address is assigned to said first LAN radio depending upon the specific subgroup within said group to which said individual equipped with said first LAN radio belongs.

6. The method of claim 5, wherein said step of assigning said first and second multicast IP addresses to said first LAN radio is carried out by an algorithm using role and group membership information.

7. The method of claim 5, wherein said step of assigning said first and second multicast IP addresses to said first LAN radio is carried out by a database using role and group membership information.

8. The method of claim 5, wherein said group comprises a military organization.

9. The method of claim 1, further comprising the steps of assigning a supplemental multicast IP address corresponding to a generic class to at least said first LAN radio and routing communications between said plurality of LAN radios such that information intended for an individual acting in said generic class is identified by said supplemental multicast IP address and only delivered to LAN radios having said supplemental multicast IP address.

10. The method of claim 9, wherein said supplemental multicast IP address is assigned to said first LAN radio when an individual using said first LAN radio logs in.

11. The method of claim 10, wherein said first LAN radio is assigned said supplemental multicast IP address subsequent to being assigned said first multicast address.

12. The method of claim 4, further comprising the steps of assigning a supplemental multicast IP address corresponding to a generic class to at least said LAN radio and routing communications between said plurality of LAN radios such that information intended for an individual acting in said generic class is identified by said supplemental multicast IP address and only delivered to LAN radios having said supplemental multicast IP address.

* * * * *